United States Patent
Xu et al.

(10) Patent No.: US 10,547,064 B2
(45) Date of Patent: Jan. 28, 2020

(54) TUNNEL CROSS SECTION FOR MORE UNIFORMED CONTACT PRESSURE DISTRIBUTION ON METAL BEAD SEAL AT THE INTERSECTION BETWEEN BEAD AND TUNNEL

(71) Applicant: GM GLOBAL TECHNOLOGY OPERATIONS LLC, Detroit, MI (US)

(72) Inventors: Siguang Xu, Rochester Hills, MI (US); Xi Yang, Bloomfield Hills, MI (US); Ivan D. Chapman, Rochester, MI (US); Liang Xi, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 383 days.

(21) Appl. No.: 15/285,795

(22) Filed: Oct. 5, 2016

(65) Prior Publication Data

US 2018/0097242 A1    Apr. 5, 2018

(51) Int. Cl.
| | |
|---|---|
| *H01M 8/026* | (2016.01) |
| *H01M 8/0267* | (2016.01) |
| *H01M 8/1039* | (2016.01) |
| *H01M 8/1007* | (2016.01) |

(Continued)

(52) U.S. Cl.
CPC ......... *H01M 8/026* (2013.01); *H01M 8/0267* (2013.01); *H01M 8/1039* (2013.01); *H01M 8/1004* (2013.01); *H01M 8/1007* (2016.02); *H01M 2008/1095* (2013.01); *H01M 2250/20* (2013.01); *H01M 2300/0082* (2013.01)

(58) Field of Classification Search
CPC .. H01M 8/026; H01M 8/0267; H01M 8/1004; H01M 8/1007; H01M 8/1039; B60L 11/18; B60L 50/72
See application file for complete search history.

(56) References Cited

U.S. PATENT DOCUMENTS

| | | | | |
|---|---|---|---|---|
| 6,017,648 A | * | 1/2000 | Jones | H01M 8/0247 429/434 |
| 2002/0009630 A1 | * | 1/2002 | Gao | H01M 8/0206 429/518 |

(Continued)

FOREIGN PATENT DOCUMENTS

JP    2010199065    *    9/2010

OTHER PUBLICATIONS

JP 2010199065 MT (Year: 1999).*

*Primary Examiner* — Alexander Usyatinsky
(74) *Attorney, Agent, or Firm* — Reising Ethington P.C.

(57) ABSTRACT

A fuel cell flow field plate providing a uniform gas flow pressure includes a first metal plate and a second metal plate. The first metal plate defines a first opening for providing a first reactant gas to a fuel cell with a first metal bead that surrounds the first opening. The first metal bead is an embossment that defines a first channel. A first plurality of tunnels provides a passage into and out of the first metal bead. Each tunnel of the first plurality of tunnels has an inlet tunnel section that leads to the first metal bead and an outlet tunnel section that extends from the first metal bead to provide the first reactant gas to first reactant gas flow channels defined by the first metal plate. Characteristically, the inlet tunnel section and the outlet tunnel section each having a curved cross section with an opened base side.

17 Claims, 7 Drawing Sheets

(51) Int. Cl.
*H01M 8/1004* (2016.01)
*H01M 8/1018* (2016.01)

(56) References Cited

U.S. PATENT DOCUMENTS

| | | | | |
|---|---|---|---|---|
| 2004/0048126 A1* | 3/2004 | Shibata | ............... | H01M 8/02 |
| | | | | 429/483 |
| 2011/0065016 A1* | 3/2011 | Sata | ............... | H01M 8/0223 |
| | | | | 429/469 |
| 2011/0229788 A1* | 9/2011 | Reinert | ............... | H01M 8/0206 |
| | | | | 429/457 |
| 2012/0129073 A1* | 5/2012 | Spencer | ............... | H01M 8/0247 |
| | | | | 429/460 |
| 2017/0229717 A1* | 8/2017 | Luong | ............... | H01M 8/2404 |

* cited by examiner

TUNNEL CROSS SECTION FOR MORE UNIFORMED CONTACT PRESSURE DISTRIBUTION ON METAL BEAD SEAL AT THE INTERSECTION BETWEEN BEAD AND TUNNEL

TECHNICAL FIELD

In at least one aspect, the present invention is related to fuel cell flow field plates providing uniform seal contact pressure distributions.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane ("PEM") type fuel cells, hydrogen is supplied to the anode as fuel, and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Typically, the ion conductive polymer membrane includes a perfluorosulfonic acid ("PFSA") ionomer.

The MEA is sandwiched between a pair of porous gas diffusion layers ("GDL"), which in turn are sandwiched between a pair of electrically conductive elements or plates referred to as flow fields. The flow fields function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cells in stacks in order to provide high levels of electrical power.

In the current flow field designs, tunnels intersect with a metal bead for the coolant and the reactants to pass through. Typically, the tunnels/channels have a nearly square trapezoidal cross-section (i.e., wall angle greater than 45 degrees). The flow tunnels/channels cross section are designed by primarily considering the coolant/reactant flow. However, the existence of tunnels causes large contact pressure variation at the intersection between the metal bead and the tunnel.

The primary function of metal bead is to seal the coolant or reactants from leaking outside from headers. The sealing function is provided by the contact pressure on the metal bead. Ideally, uniform contact pressure is the most favorable case. Large contact pressure variation may cause extreme low pressure at certain spot which may cause leaking.

Accordingly, the present invention provides improved contact pressure having less pressure variation at the intersection between metal bead seals and the flow channels.

SUMMARY

The present invention solves one or more problems of the prior art by providing in at least one embodiment a fuel cell flow field plate providing a uniform contact pressure/seal pressure. The flow field includes a first metal plate and a second metal plate. The first metal plate defines a first opening for providing a first reactant gas to a fuel cell with a first metal bead surrounds the first opening. The first metal bead is an embossment. A first plurality of tunnels provides a passage into and out of the first metal bead. Each tunnel of the first plurality of tunnels has an inlet tunnel section that leads to the first metal bead and an outlet tunnel section that extends from the first metal bead to provide the first reactant gas to first reactant gas flow channels defined by the first metal plate. The inlet tunnel section and the outlet tunnel section each have a curved cross section with an opened base side. Typically, the second metal plate is of a similar design. Specifically, the second metal plate defines a second opening for providing a second reactant gas to a fuel cell with a second metal bead that surrounds the second opening. The second metal bead is an embossment. A second plurality of tunnels provides a passage into and out of the second bead. Each tunnel of the second plurality of tunnels having an inlet tunnel section that leads to the second bead and an outlet tunnel section that extends from the second bead to provide the second reactant gas to second reactant gas flow channels defined by the second metal plate. The inlet tunnel section and the outlet tunnel section each haves a curved cross section with an opened base side.

In another embodiment, a fuel cell incorporating the flow fields described herein is provided. The fuel cell includes a cathode catalyst layer, an anode catalyst layer, and an ion conducting membrane interposed between the cathode catalyst layer and the anode catalyst layer. A first gas diffusion layer is disposed over and adjacent to the cathode catalyst layer and a second gas diffusion layer disposed over and adjacent to the anode catalyst layer. A first flow field disposed over and adjacent to the first gas diffusion layer and a second flow field disposed over and adjacent to the second gas diffusion layer. The first flow field includes a first metal plate and a second metal plate. The first metal plate defines a first opening for providing a first reactant gas to a fuel cell with a first metal bead surrounds the first opening. The first metal bead is an embossment. A first plurality of tunnels provides a passage into and out of the first bead. Each tunnel of the first plurality of tunnels has an inlet tunnel section that leads to the first bead and an outlet tunnel section that extends from the first bead to provide the first reactant gas to first reactant gas flow channels defined by the first metal plate. The inlet tunnel section and the outlet tunnel section each have a curved cross section with an opened base side. Typically, the second metal plate is of a similar design. Specifically, the second metal plate defines a second opening for providing a second reactant gas to a fuel cell with a second metal bead that surrounds the second opening, the second metal bead being an embossment. A second plurality of tunnels provides a passage into and out of the second bead. Each tunnel of the second plurality of tunnels having an inlet tunnel section that leads to the second bead and an outlet tunnel section that extends from the second bead to provide the second reactant gas to second reactant gas flow channels defined by the second metal plate. The inlet tunnel section and the outlet tunnel section each haves a curved cross section with an opened base side. Typically, the first flow field is of the same design as the second flow field.

DETAILED DESCRIPTION

Figure 1:
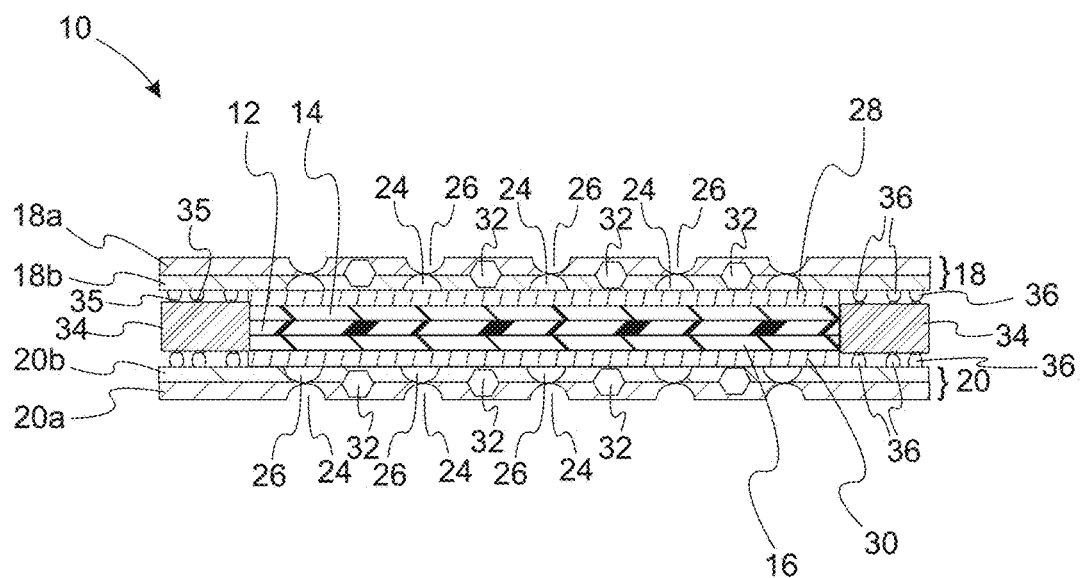
FIG. 1 provides a schematic illustration of a fuel cell incorporating a flow field defining flow channels with improved pressure distribution.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this invention pertains.

With reference to FIG. 1, an idealized schematic cross section of a fuel cell that incorporates an embodiment of a fibrous sheet is provided. Proton exchange membrane (PEM) fuel cell 10 includes polymeric ion conducting membrane 12 disposed between cathode catalyst layer 14 and anode catalyst layer 16. Fuel cell 10 also includes flow fields 18, 20 which define gas flow channels 24 and 26. Gas diffusion layers 28 and 30 disposed between flow fields 18, 20 and cathode catalyst layer 14 and anode catalyst layer 16, respectively. During operation of the fuel cell 10, a fuel such as hydrogen is feed to anode catalyst layer 16 through gas flow channels 26 and an oxidant such as oxygen is feed to cathode catalyst layer 14 through gas flow channels 24. Flow fields 18, 20 also define cooling channels 32 which are used to flow coolant through the flow field plates. It should be appreciated that flow fields 18, 20 are each typically formed from two metal plates are provided. For example, flow field 18 is formed from channel-defining plates 18a and 18b while flow field 20 is formed from channel-defining plates 20a and 20b. In a refinement, metal plates 18a, 18b, 20a, 20b have a thickness from about 0.05 mm to 0.5 mm. It should also be pointed out that FIG. 1 is an idealized schematic and that gas flow channels 24 and 26 are also formed by embossing plates 18a, 18b, 20a and 20b. FIG. 1 also depicts the side sealing of the fuel cell in which peripheral gasket 34 seals to embossments 36. Hydrogen ions are generated by anode catalyst layer 16 migrate through polymeric ion conducting membrane 12 were they react at cathode catalyst layer 14 to form water. This electrochemical process generates an electric current through a load connect to flow field plates 18 and 20.

Figure 2:
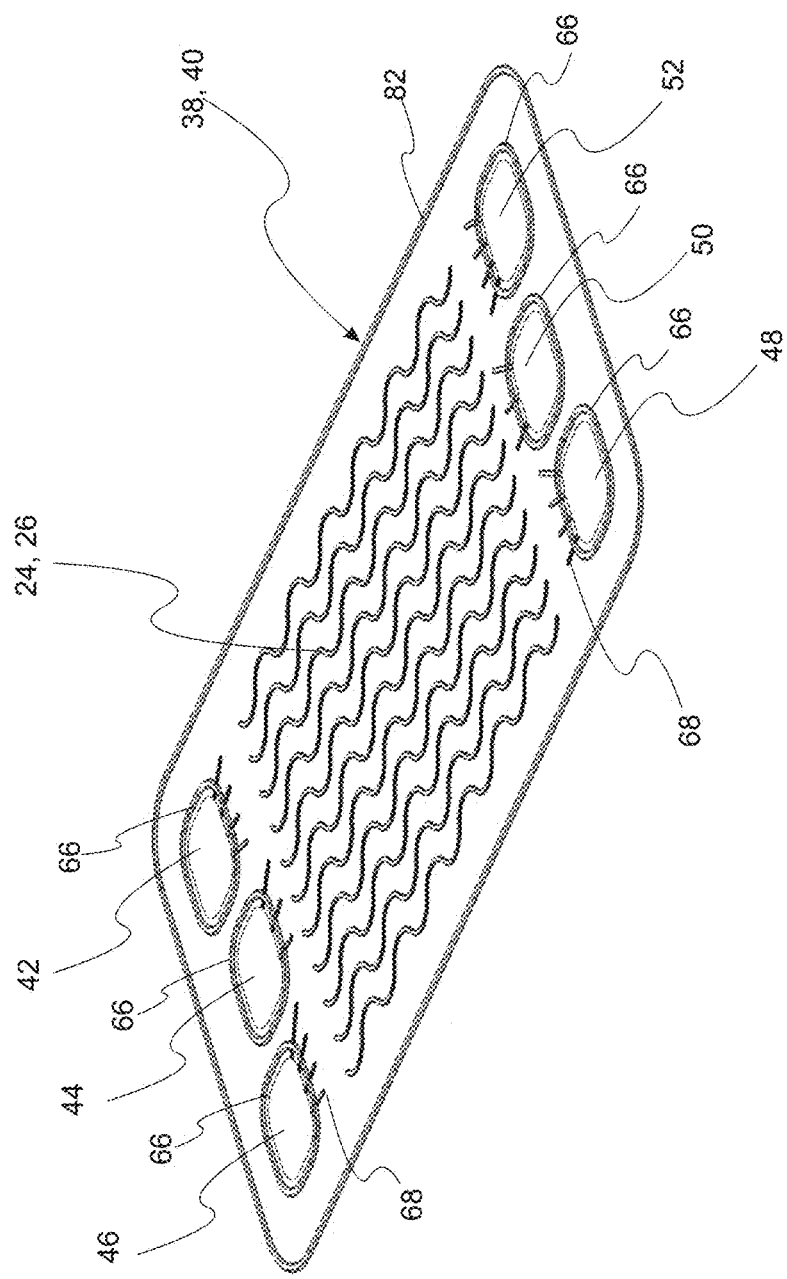
FIG. 2 is a perspective view of a metal plate used to form a fuel cell flow field.

With reference to FIGS. 1, 2, 3A, and 3B schematic illustrations show that flow fields 18, 20 are each typically formed from two metal plates are provided. For example, flow field 18 is formed from channel-defining plates 18a and 18b while flow field 20 is formed from channel-defining plates 20a and 20b. These channels and other structures are typically formed by stamping. Moreover, the metal plates including a number of openings for input and exhausting reactant gases and coolant. FIG. 2 is a perspective view of a metal plate that is typical of the design of embossed plates 18a, 18b, 20a, and 20b. Metal plates 38, 40 define openings 42-52 for introducing or exiting a liquid coolant or reactants to the flow field. In a refinement, first metal bead 66 surrounds one or more of openings 42-52. First metal bead 66 is an embossment that defines a first channel 70. Typically, the liquid coolant flows or reactants through this channel. In a refinement, a soft material (e.g., elastomer, rubber, foam, etc.) is coated on the top of metal bead 66 to make a seal between adjacent flow fields (see item number 35 in FIG. 1). Plurality of tunnels 68 provides a passage into and out of the first metal bead 66. Each tunnel 68 of the first plurality of tunnels has an inlet tunnel section 72 that leads to the first metal bead 66 and an outlet tunnel section 74 that extends from the first metal bead 66 to provide coolant or reactant gases to flow channels 24, 26. FIG. 2 also depicts a coolant flow channels 82 which is also defined by an embossment.

Figure 3:
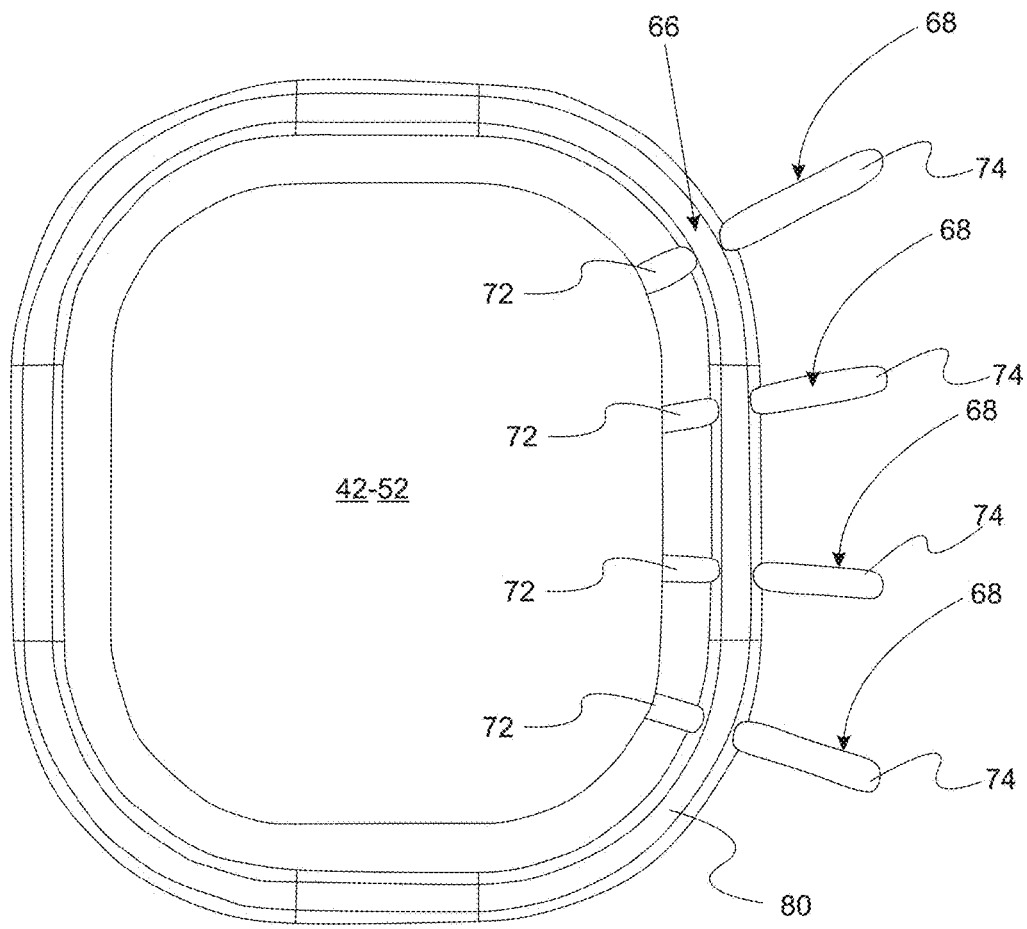
FIG. 3 is a top view a portion of a flow field defining an opening for inputting or outputting a reactant gases or coolant to a flow field.

With reference to FIG. 3, a flow field defining an opening for inputting or outputting reactant gases or coolant to the flow fields is provided. First metal bead 66 surrounds openings 42-52. First metal bead 66 is an embodiment that defines a first channel 90. In a refinement, a soft material (e.g., elastomer, rubber, foam, etc.) is coated on the top of metal bead 66 to make a seal between adjacent flow fields. Plurality of tunnels 68 provides a passage into and out of the channel 80 which is defined by first metal bead 66. Each tunnel 68 of the first plurality of tunnels has an inlet tunnel section 72 that leads to the first channel 90 and an outlet tunnel section 94 that extends from the first channel 80 to provide a reactant gas or coolant to flow channels 24, 26.

Figure 4A:
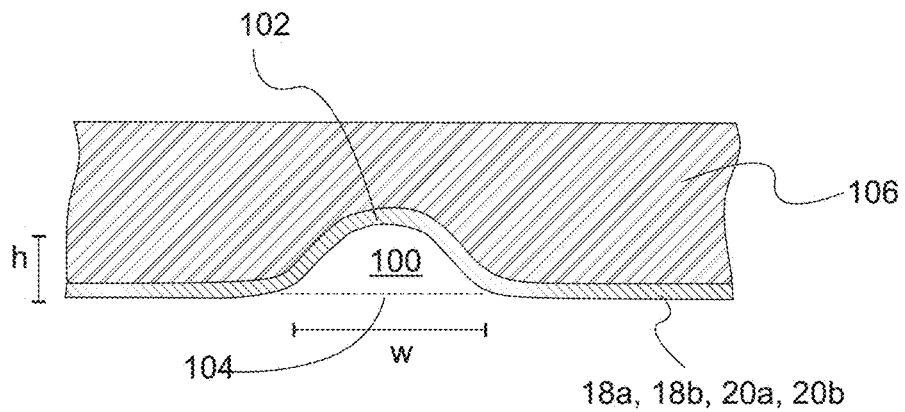
FIG. 4A is a cross section of a metal plate defining a tunnel with a curved cross section.
Figure 4B:
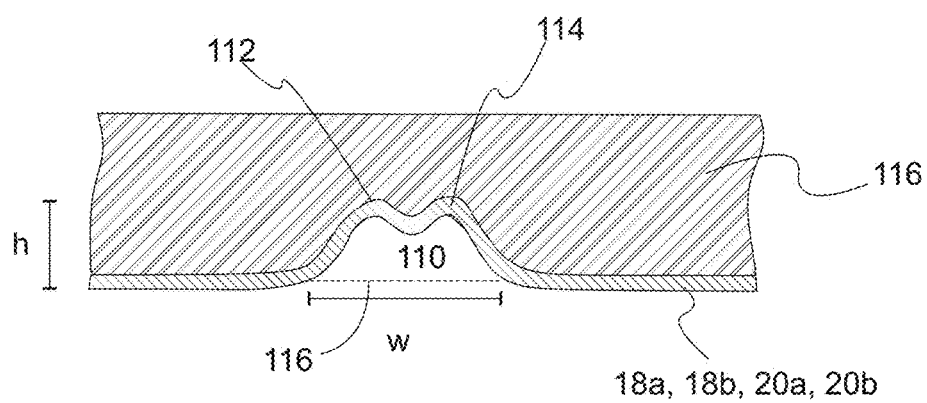
FIG. 4B is a cross section of a metal plate defining a tunnel with a cross section having two lobes.

With reference to FIGS. 4A and 4B, schematic cross sections of a flow tunnel with a curved section is provided. FIG. 4A depicts flow tunnel 100 which is formed in any of plates 18a, 18b, 20a, 20b as set forth above. Flow tunnel 100 which has an upper wall that is has a single arc 102 in cross section and an open base 104. FIG. 4A also depicts channel-defining metal bead 106 to which tunnel 100 flows. Flow tunnel 100 provides a design for the tunnels of plurality of tunnels 68 of FIG. 3A and of the plurality of tunnels 88 of FIG. 3B. In particular, the cross section of upper wall 102 is approximated by a section of the circumference of a circle. In a refinement, open base width w is from about 0.4 mm to about 3 mm. Flow tunnel 100 is also defined by a maximum height which is the perpendicular distance from open base 104 to the top of the channel. In a refinement, the maximum height h is from about 0.1 mm to about 2 mm. When a section of flow tunnel 100 is approximated by a portion of the circumference of a circle, the circle has a radius from about 0.2 to about 3 mm.

FIG. 4B depicts flow tunnel 110 which is formed in any of plates 18a, 18b, 20a, 20b as set forth above. In this refinement, flow tunnel 110 has a cross section with at least two lobes 112, 114. Flow tunnel 110 has a base (e.g., imaginary or a wall) and a maximum height which is the perpendicular distance from the open base 104 to the top of the channel. FIG. 4B also depicts channel-defining metal bead 116 to which tunnel 110 flows. In a refinement, open base width w is from about 0.4 mm to about 3 mm. In a further refinement, the maximum height h is from about 0.1 mm to about 2 mm.

Figure 5A:
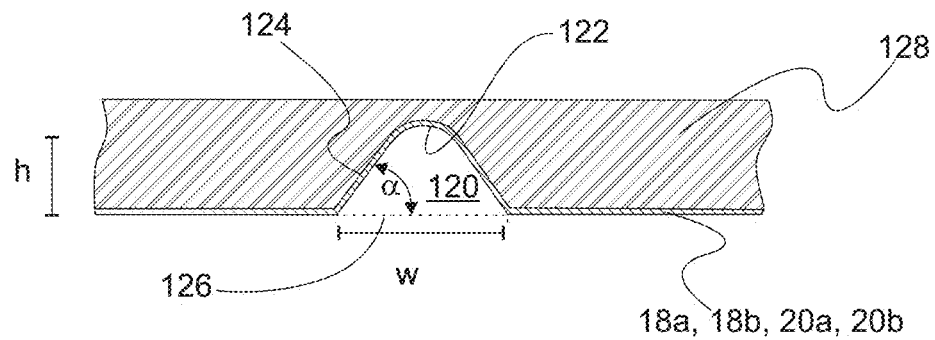
FIG. 5A is a cross section of a metal plate defining a tunnel with straight sides and a curved top.

FIG. 5A depicts a flow tunnel with straight sides and a curved top in cross section. In this refinement, flow tunnel 120 has a cross section with an upper curved surface 122. Flow channel 120 has a wall angle α (i.e., angle between wall 124 and open base 126) is from 10 to 80 degrees. Flow channel 120 is defined by a base and a maximum height which is the perpendicular distance from the base to the top of the channel. FIG. 5A also depicts channel-defining metal bead 128 to which tunnel 120 flows. In a refinement, the base width is from about 0.4 mm to about 3 mm. In a further refinement, the maximum height h is from about 0.1 mm to about 3 mm. In a refinement, linear side 124 is from about 0.1 to 3 mm in length.

Figure 5B:
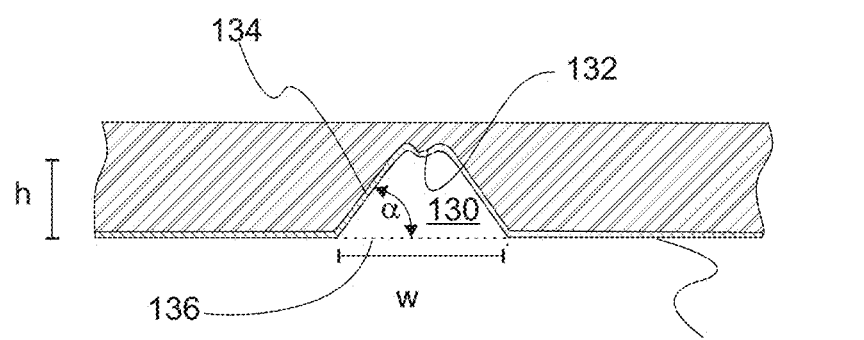
FIG. 5B is a cross section of a metal plate defining a tunnel with straight sides and two lobes.

FIG. 5B depicts a flow tunnel with straight sides and a multi-lobed top in cross section. In this refinement, flow channel 130 has a wall angle α is from 10 to 80 degrees. Flow channel 130 is defined by a base and a maximum height h which is the perpendicular distance from the open base to the top of the channel. In a refinement, the open base width w is from about 0.4 mm to about 3 mm. In a further refinement, the maximum height h is from about 0.1 mm to about 3 mm. In a refinement, linear side 124 is from about 0.1 to 3 mm in length.

In a variation, the tunnels of FIGS. 4A, 4B, 5A, and 5B have a cross sectional area from about 0.005 to 3 $mm^2$. In a refinement, the tunnels of FIGS. 4A, 4B, 5A, and 5B have a cross sectional area from about 0.01 to 1 $mm^2$. In still another refinement, the tunnels of FIGS. 4A, 4B, 5A, and 5B have a cross sectional area from about 0.01 to 0.5 $mm^2$. It should also be appreciated that the cross sectional area of the tunnels can vary along the flow direction. For example, the cross sectional area can be large near the inlet and outlet and small near the metal bead.

Figure 6:
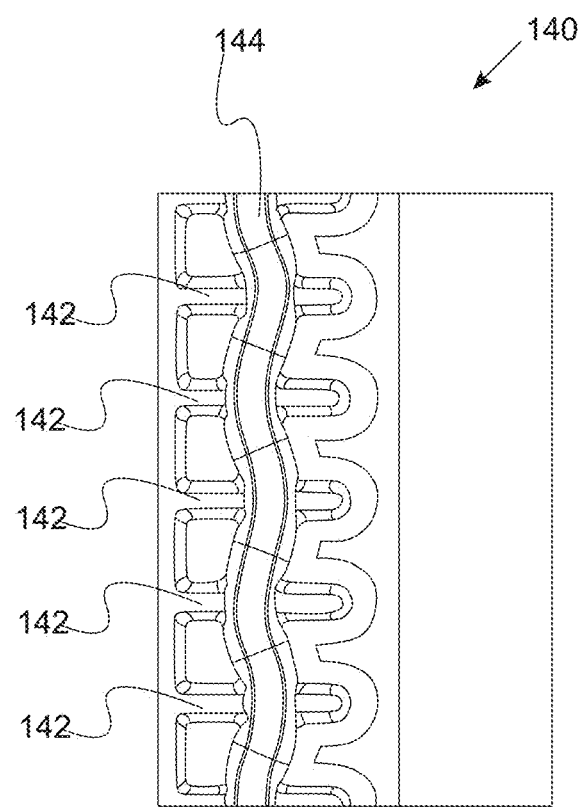
FIG. 6 illustrates the basic design of a test coupon that was used to determine the pressures on the metal bead seal for various tunnel cross sections FIG. 7A provides a plot of the seal contact pressure for prior art flow channel.
Figure 7C:
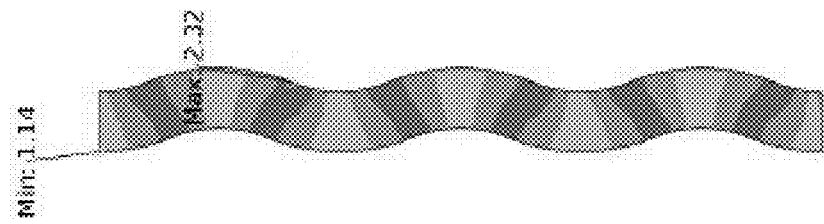
FIG. 7C provides a plot of the seal contact pressure for a flow channel having a low trapezoidal cross section.
Figure 7B:
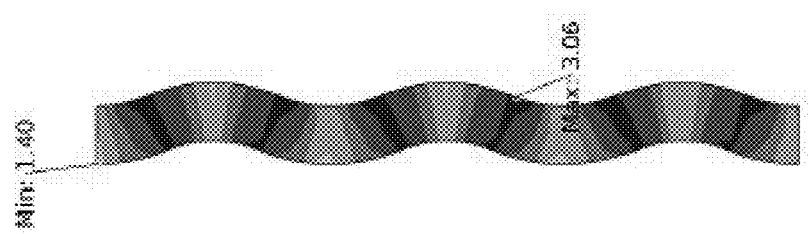
FIG. 7B provides a plot of the seal contact pressure for a flow channel having a round section.
Figure 7A:
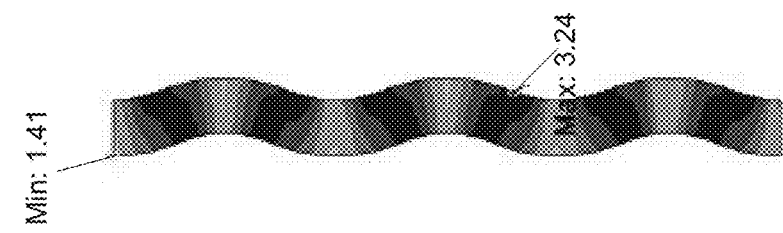

FIG. 6 illustrates the basic design of a test coupon that was used to determine the pressures for various tunnel cross sections. Pressure fields were determined by finite element analysis using a compression height of 100 microns. Test coupon 140 includes tunnels 142 and metal sealing bead 144. FIG. 7A provides the pressures in a prior art channel. These channels show a pressure variation range of about 1.83 MPa. FIG. 7B provides the pressures in a channel with a round cross section. These channels show a pressure variation range of about 1.66 MPa. FIG. 7C provides the pressures in a channel with a short trapezoidal cross section. These channels show a pressure variation range of about 1.18 MPa.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments, variations, and refinements may be combined to form further embodiments of the invention.

What is claimed is:

1. A flow field for a fuel cell, the flow field comprising:
  a first metal plate defining a first opening for providing a first reactant gas to a fuel cell, a first metal bead that surrounds the first opening, the first metal bead being an embossment that defines a first channel, a first plurality of tunnels that provide a passage into and out of the first metal bead, each tunnel of the first plurality of tunnels having an inlet tunnel section that leads to the first channel and an outlet tunnel section that extends from the first metal bead to provide the first reactant gas to first reactant gas flow channels defined by the first metal plate, each of the plurality of tunnels further having an upper wall extending between the inlet tunnel section and the outlet tunnel section and having a curved cross section opposite an opened base side; and a second metal plate that aligns with the first metal plate.

2. The flow field of claim 1 wherein the curved cross section of the upper wall defines a single arc.

3. The flow field of claim 2 wherein the upper wall includes a curved top surface and straight sides extending from the curved top surface to the opened base side.

4. The flow field of claim 2 wherein the upper wall has a maximum distance perpendicular from the opened base side that is from about 0.1 mm to about 2 mm and a width at the opened base side from about 0.4 mm to about 3 mm.

5. The flow field of claim 1 wherein the curved cross section of the upper wall is a portion of a circumference of a circle.

6. The flow field of claim 5 wherein the curved cross section of the upper wall has a radius from about 0.2 to about 3 mm.

7. The flow field of claim 1 wherein the upper wall has at least two lobes on a side that contacts a sealing bead.

8. The flow field of claim 7 wherein the upper wall has a maximum distance perpendicular from the opened base side that is from about 0.1 mm to about 2 mm and a width at the opened base side from about 0.4 mm to about 3 mm.

9. The flow field of claim 7 wherein the upper wall has straight sides extending from the two lobes to the opened base side.

10. The flow field of claim 1 wherein the first metal plate further defines a cooling channel for flowing coolant.

11. The flow field of claim 1 wherein a soft material is coated on the first metal bead.

12. A fuel cell comprising
a cathode catalyst layer;
an anode catalyst layer;
an ion conducting membrane interposed between the cathode catalyst layer and the anode catalyst layer;
a first gas diffusion layer disposed over and adjacent to the cathode catalyst layer;
a second gas diffusion layer disposed over and adjacent to the anode catalyst layer;
a first flow field disposed over and adjacent to the first gas diffusion layer; and
a second flow field disposed over and adjacent to the second gas diffusion layer, the first flow field and second flow field each independently comprising:
a first metal plate defining a first opening for providing a first reactant gas to a fuel cell, a first metal bead that surrounds the first opening, the first metal bead being an embossment that defines a first channel, a first plurality of tunnels that provide a passage into and out of the first metal bead, each tunnel of the first plurality of tunnels having an inlet tunnel section that leads to the first metal bead and an outlet tunnel section that extends from the first metal bead to provide the first reactant gas to first reactant gas flow channels defined by the first metal plate, each of the plurality of tunnels further having an upper wall extending between the inlet tunnel section and the outlet tunnel section and having a curved cross section opposite an opened base side; and
a second metal plate that aligns with the first metal plate.

13. The fuel cell of claim 12 further comprising a peripheral gasket that seals the first flow field to the second flow field, the first flow field being sealed to the peripheral gasket with a sealing composition.

14. The fuel cell of claim 12 wherein the curved cross section of the upper wall defines a single arc.

15. The fuel cell of claim 14 wherein the upper wall includes a curved top surface and straight sides extending from the curved top surface to the opened based side.

16. The fuel cell of claim 12 wherein the upper wall has at least two lobes on a side that contacts a sealing bead.

17. The fuel cell of claim 16 wherein the upper wall has straight sides extending from the two lobes to the opened base side.

* * * * *